(12) United States Patent
Kutter et al.

(10) Patent No.: US 11,315,004 B2
(45) Date of Patent: Apr. 26, 2022

(54) APPARATUS AND METHOD FOR SECURING A PRODUCT AGAINST FORGERY

(71) Applicant: Fraunhofer-Gesellschaft zur Foerderung der angewandten Forschung e.V., Munich (DE)

(72) Inventors: Christoph Kutter, Munich (DE); Indranil Bose, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/734,002

(22) Filed: Jan. 3, 2020

(65) Prior Publication Data
US 2020/0143222 A1 May 7, 2020

Related U.S. Application Data

(63) Continuation of application No. PCT/EP2018/068422, filed on Jul. 6, 2018.

(30) Foreign Application Priority Data

Jul. 6, 2017 (DE) .......................... 102017006389.3

(51) Int. Cl.
G06K 19/077 (2006.01)
G06K 19/02 (2006.01)
G06K 19/07 (2006.01)

(52) U.S. Cl.
CPC ..... G06K 19/07758 (2013.01); G06K 19/025 (2013.01); G06K 19/0723 (2013.01)

(58) Field of Classification Search
CPC .. G06K 19/025; G06K 19/07; G06K 19/0723; G06K 19/07756; G06K 19/07788; G06K 19/07775
USPC .................................................. 235/492, 488
See application file for complete search history.

(56) References Cited

U.S. PATENT DOCUMENTS

| 2005/0150740 A1* | 7/2005 | Finkenzeller ............ G07D 7/01 194/207 |
| 2006/0011449 A1* | 1/2006 | Knoll ....................... G07D 7/01 194/214 |
| 2008/0217414 A1* | 9/2008 | Ito .................... G06K 19/07703 235/492 |

FOREIGN PATENT DOCUMENTS

| DE | 10163267 A1 | 7/2003 |
| DE | 102005032303 A1 | 1/2007 |
| DE | 102007002727 A1 | 7/2008 |
| DE | 202011004764 | 8/2012 |

(Continued)

*Primary Examiner* — Suezu Ellis
(74) *Attorney, Agent, or Firm* — Perkins Coie LLP; Michael A. Glenn

(57) ABSTRACT

Among other things, the invention concerns an apparatus for securing a product against forgery, the apparatus including a microchip with an integrated circuit that may be read out in a contactless manner, a first metallization layer arranged on a first chip side of the microchip, and a second metallization layer arranged on a second chip side opposite to the first chip side. The first and second metallization layers are each electrically coupled to the integrated circuit and function as electrodes for a capacitive readout of the integrated circuit. The microchip is fixable to the product or integrable into the product. The invention further concerns the use of a microchip as a security feature in a product as well as a method for securing a product against forgery.

14 Claims, 9 Drawing Sheets

(56) References Cited

FOREIGN PATENT DOCUMENTS

| DE | 102013022310 A1 | 2/2015 |
|----|-----------------|--------|
| WO | 0014680 A1 | 3/2000 |
| ZA | 200404064 B | 4/2005 |

\* cited by examiner

APPARATUS AND METHOD FOR SECURING A PRODUCT AGAINST FORGERY

CROSS-REFERENCES TO RELATED APPLICATIONS

This application is a continuation of copending International Application No. PCT/EP2018/068422, filed Jul. 6, 2018, which is incorporated herein by reference in its entirety, and additionally claims priority from German Application No. DE 102017006389.3, filed Jul. 6, 2017, which is incorporated herein by reference in its entirety.

BACKGROUND OF THE INVENTION

The invention concerns an apparatus for securing a product against forgery as well as for storing crypto information, and in particular an electronic chip in flat, sheet-like objects, and a method for its operation. An example for this would be an electronic chip embedded into a banknote for securing the banknote against forgery.

Documents in general, and in particular official or other institutionally issued documents such as passports, identity cards, certificates, but also banknotes, are the target of forgeries. In order to prevent forgery of such official documents and banknotes, there are currently a number of security features that may be integrated into the documents or banknotes, respectively.

However, particularly with respect to banknotes, electronic security features have not been realized to date, since integration costs have been too high up to the present. It costs around 8 euro-cents to produce a banknote. Accordingly, in order to maintain economic viability in the production of banknotes, the costs of a system integration of electronic components should not amount to more than ten percent of these manufacturing costs.

A further problem rises with automatic verification procedures for verifying documents and banknotes as to their authenticity. For example, counting devices for banknotes comprise grippers that may successively take individual banknotes from a stack of banknotes and place them onto another stack. During this counting phase, or restacking phase, only a short period of time of typically 0.025 seconds, or 25 ms, is available per banknote. In this period of time, a banknote is to be counted, checked for authenticity, and its serial number is to be read out.

Contactless transmission methods such as RFID (Radio Frequency Identification) are known. However, these technologies, which comprise dipole antennas or antenna coils for the contactless readout of RFID tags, need significantly more time.

Previous attempts to integrate conventional RFID semiconductor chips into paper, in particular into banknotes or other security-relevant documents, have failed due to the requirement that their chip-external antenna (coil or dipole) has to be contacted with contact pads on the chip. Due to the high mobility or the small bending radius of documents and banknotes during use, these contacts are delaminated and tear open.

In order to electrically connect such chip-external antennas to the chip, complex and expensive process steps are further needed during the production. In addition, the effort for the exact placement of the chip relatively to the antenna is high and the manufacturing costs increase accordingly. The above-mentioned problems were already described in publications of the Deutsche Bundesbank (central bank of the Federal Republic of Germany).

However, the problems exemplarily described with respect to banknotes generally also apply to other official documents, which are increasingly the target of forgery.

Thus, it would desirable to provide an apparatus for securing a product against forgery, and in particular for securing previously-mentioned official documents and banknotes against forgery, wherein this apparatus is easy to manufacture and permanently attachable to the product or integrable into the product, and wherein this apparatus at the same time comprises a high robustness and yet being inexpensive to produce.

SUMMARY

According to an embodiment, an apparatus may have: a microchip with an integrated circuit that may be read out in a contactless manner, a first metallization layer arranged on a first chip side of the microchip, and a second metallization layer arranged on a second chip side opposite to the first chip side, wherein the first and second metallization layers are each electrically coupled to the integrated circuit and function as electrodes for a capacitive readout of the integrated circuit, wherein the microchip is fixable to the product or integrable into the product.

Another embodiment may have the use of a microchip as a security feature in a product, wherein the microchip has an integrated circuit that may be read out in a contactless manner, a first metallization layer arranged on a first chip side of the microchip, and a second metallization layer arranged on a second chip side opposite to the first chip side, wherein the first and second metallization layers are each electrically coupled to the integrated circuit and function as electrodes for a capacitive readout of the integrated circuit, wherein the microchip is fixed to the product or integrated into the product.

Another embodiment may have a machine for handling a product having an inventive apparatus, wherein the machine has a first region including metal and a second region including metal arranged opposite thereto, wherein, for the capacitive readout of the integrated circuit, the first region including metal functions as a counterelectrode to the first metallization layer functioning as an electrode, and the second region including metal functions as a counterelectrode to the second metallization layer functioning as an electrode, and wherein, for the readout of the integrated circuit, the first region including metal is locally superimposable with the first metallization layer at least in portions, and wherein the second region including metal is locally superimposable with the second metallization layer at least in portions.

According to another embodiment, a method may have the steps of: providing a microchip with an integrated circuit that may be read out in a contactless manner, a first metallization layer arranged on a first chip side of the microchip, and a second metallization layer arranged on a second chip side opposite to the first chip side, wherein the first and the second metallization layers are each electrically coupled to the integrated circuit and function as electrodes for a capacitive readout of the integrated circuit, and fixing the microchip to the product or integrating the microchip into the product.

Another embodiment may have an RFID chip to be embedded into a sheet-like document, with two opposing metal surfaces, wherein the metal surfaces are connected to two contacts of the RFID chip.

Another embodiment may have an RFID chip integrated into the paper of a sheet-like document, wherein the RFID chip does not have any touching contact regions.

Another embodiment may have an apparatus for counting and checking sheet-like documents, in particular banknotes, having two grippers provided with counterelectrodes and arranged in the area of the metallizations of the chip.

Another embodiment may have a method for the readout of information from at least one RFID chip embedded into at least one sheet-like document, wherein counterelectrodes arranged at grippers are coupled to metallizations of the RFID chip by means of capacitive coupling, and wherein information is read out from the RFID chip by means of capacitive coupling.

An aspect of the invention concerns an apparatus for securing a product against forgery and/or for storing crypto information. Among other things, the apparatus comprises a microchip and an integrated circuit that may be read out in a contactless manner. For example, the integrated circuit may comprise a memory, in particular a non-volatile memory, in which an electronic security feature such as a unique number may be stored. For example, this number may be a continuous serial number or an identification number. Other electronic security features that enable an authentication of the product are also conceivable. For example, crypto information, among other things enabling the authentication of crypto currency, may be stored in the memory. The microchip comprises a first metallization layer and a second metallization layer, wherein the first metallization layer is arranged on a first chip side, and wherein the second metallization layer is arranged on an opposite second chip side. Both metallization layers are each electrically coupled to the integrated circuit and each function as an electrode for a capacitive readout of the integrated circuit. In particular, the above-mentioned memory of the integrated circuit may be capacitively read out in a contactless manner. In the capacitive readout, the metallization layers of the microchip functioning as electrodes are brought into the proximity of a respective counterelectrode, wherein the respective counterelectrode may be arranged at a reading device, for example. According to the invention, the microchip is arrangeable, or fixable, at the product to be authenticated, or is integrable into said product. If the microchip is integrated into the product, the product itself, or a material which the product is made from, may cover the microchip and in particular the first and/or second metallization layer at least in portions. In this case, the product, or the material of the product, covering the respective metallization layer may function as a dielectric between the metallization layer implemented as electrode and a corresponding counterelectrode in order to enable the contactless capacitive readout of the integrated circuit. If the microchip is fixed at the product, and in particular at an outside of the product, at least one air gap may function as a dielectric between the respective metallization layer implemented as electrode and a corresponding counterelectrode in order to enable the contactless capacitive readout of the integrated circuit. During the capacitive readout, the range may be significantly smaller than in conventional RFID systems, which transfer information via radio waves and antennas. However, the shorter range may be desirable, e.g., in order to prevent an authorized readout of the integrated circuit.

According to an embodiment, the microchip may be fixable to the product such that at least one of the first and second metallization layers is covered by a portion of the product. In this case, for example, the microchip may therefore be arranged, or fixed, on the outside of the product.

In this case, a portion of the product may cover the microchip, and in particular the at least one metallization layer, at least in portions. A portion of the product may be a part of the product itself, or may be a component of the product arranged at the product or belonging to the product. For example, the product may be a banknote, wherein the at least one metallization layer of the microchip may be covered by a part of the banknote itself at least in portions, for example. For example, it would also be conceivable that the banknote comprises a security feature such as a metal strip or a polymer strip, a watermark, a window or the like, that is arranged at or integrated into the same, wherein the at least one metallization layer of the microchip may be covered at least in portions by said security feature. Alternatively to arranging the microchip at or on the product, the microchip may be integrated into the product. In such a case, the microchip could be integrated into the product such that the first and the second metallization layers would each be fully covered by the product. In this case, the part of the product covering the metallization layer may function as a dielectric between the respective metallization layer and a corresponding counterelectrode. Alternatively or additionally, an air gap may be present as an additional dielectric between the respective metallization layer and the corresponding counterelectrode. Thus, according to the invention, the product itself or a part of the product covering the first and/or metallization layer may be present in order to provide a dielectric between the respective metallization layer functioning as electrode and a corresponding counterelectrode in a capacitive readout process. Thus, in a readout process, the counterelectrode of the reader does not touch the respective metallization layer. However, in a readout process, it would be conceivable that the counterelectrode touches the product itself or the part of the product covering the metallization layer. In both cases, the capacitive readout is done in a contactless manner, wherein contactless may refer to the contact between the respective metallization layer functioning as electrode and a corresponding counterelectrode for the readout. For example, the product itself may consist of several sheets of paper, wherein one of the sheets covers at least one of the first and second metallization layers. Thus, for example, in papermaking, the microchip may be integrated into the product comprising the paper. The microchip may be fully integrated into the material of the product, e.g. laminated, which would be conceivable in products comprising plastic, for example. The portion of the product covering the metallization layer may be a component of the product that is additionally arranged at the product, for example. For example, this may be a sticker that is stuck onto the product and therefore covers the microchip or the at least one metallization layer at least in portions. In the case of banknotes, the portion covering the at least one metallization layer at least in portions may be a security feature that is arranged at the banknote. For example, a polymer strip, a hologram, a kinetic image, a security thread, a watermark, a foil element or any other security feature may be arranged at the banknote and may be the portion of the banknote that covers the at least one metallization layer at least in portions. That is, the at least one metallization layer may be covered at least in portions by the respective security feature of the banknote.

According to a further embodiment, the at least one metallization layer may be fully covered by the portion of the product. Thus, the portion of the product functioning as a dielectric may be implemented fully around the at least one metallization layer, which in turn improves the quality of the capacitive readout. In addition, this may provide an additional mechanical protection of the at least one metallization layer and of the overall microchip.

According to a further embodiment, the first metallization layer arranged on the first chip side may be coupled to a first electric contact of the integrated circuit, and the second metallization layer arranged on the second chip side may be coupled to a second electric contact of the integrated circuit. Thus, for example, positively and negatively charged electrodes may be provided. In this case, the first and second electric contacts of the integrated circuit may be arranged on the first chip side, and the microchip may comprise a via extending between the first and second chip sides, wherein the second metallization layer arranged on the second chip side may be coupled to the second electric contact arranged on the first chip side through this via. This via provides a space-efficient option for electrically contacting the second metallization layer, even if it were to be arranged on the chip side of the microchip opposite to the electric contacts.

According to a further embodiment, a part of the product covering the first metallization layer may be arranged on a first side of the product, and a part of the product covering the second metallization layer may be arranged on a second side of the product opposite to the first side. That is, the first metallization layer may face a first side of the product and may be covered by a part, or portion, of the product arranged on this first product side. On the other hand, the second metallization layer may face a second side of the product and may be covered by a part, or portion, of the product arranged on this second product side. Particularly in thin sheet-like products such as documents and banknotes, the first metallization layer may be arranged in parallel to the first side of the product, and the second metallization layer may be arranged in parallel to the second side of the product opposite to the first side. Thus, one metallization layer each functioning as an electrode may be arranged on both sides of the product so that the integrated circuit may be read out from both sides of the product. When applying an AC voltage, the capacitive readout may even be performed regardless of the orientation of the product.

According to a further embodiment, the first metallization layer may at least partially cover the first chip side, or the first metallization layer may fully cover the first chip side. Alternatively or additionally, the second metallization layer may at least partially cover the second chip side, or the second metallization layer may fully cover the second chip side. Partially covering the respective chip side leads to material savings and to a cheaper production of the microchip. Fully covering the respective chip side leads to a larger effective electrode area and therefore to an improved quality of the capacitive readout.

According to a further embodiment, the apparatus may be configured without an antenna, without an antenna particularly referring to microchip-external antennas. That is, the apparatus may be configured such that it does not comprise a microchip-external antenna. This significantly differentiates the apparatus according to the invention from RFID chips according to the conventional technology. The conventional technology provides microchip-external antennas that are connected to the contact pads of the RFID microchip. However, when integrated into flexible products, these terminals tend to delaminate and to tear open. On the other hand, in the apparatus according to the invention, the metallization layers may be arranged directly on the first and/or second chip side, e.g. using a deposition method. That is, the metallization layers functioning as electrodes may be integrated into the microchip. Thus, the metallization layers may form a capacitive antenna, wherein this capacitive antenna, in contrast to above-described microchip-external antennas, may be integrated into the microchip. According to this embodiment, complex and less-robust contacting of microchip-external antennas is avoided, leading to a significant increase of the robustness and durability.

According to a further embodiment, the apparatus may be configured such that the contactless capacitive readout of the integrated circuit comprises a range of below 10 mm, and advantageously below 1 mm. This small range also differs from the conventional technology, wherein an integrated circuit is read out by means of radio waves and antennas. In such conventional systems, a large range is desired. In contrast, a small range of below 10 mm, or advantageously below 1 mm, is desired in the apparatus according to the invention. On the one hand, this leads to significant energy savings compared to conventional systems. On the other hand, an unauthorized readout of the integrated circuit may be effectively avoided over such short distances.

According to a further embodiment, the apparatus may further comprise a photodiode which may be electrically coupled to the integrated circuit, wherein the integrated circuit may be implemented to enable the capacitive readout only when the photodiode registers light flashes in a predetermined order, and/or in a predetermined frequency, and/or in a predetermined wavelength range. For example, light flashes in a predetermined order may be a predetermined sequence of successive light flashes. The predetermined frequency of the light flashes is understood as the frequency of the occurrence of light flashes. For example, the predetermined wavelength range of the light flashes may extend from infrared light across the visible wavelength range to ultraviolet light. Advantageously, the light flashes may be generated during the capacitive readout process. For example, the light flashes may be output by a reading device. Registering such light flashes by means of the additional photodiode is an additional protection mechanism for securing the product against forgery.

According to a further embodiment, the product to be authenticated may be configured in a sheet-like manner and may comprise paper and/or plastic. Non-limiting examples for this may be: an official document such as a passport or a certificate, or a banknote, or an access card such as a ticket for a concert or a football match, or a ski pass, or a debit card or an access card. According to a further embodiment, the product may comprise a special paper, such as a paper used for printing documents and/or bonds and/or banknotes. This paper may only be used in particularly authorized print shops. A microchip integrated into a product not comprising such a special paper may therefore be identified as a forged chip.

According to a further embodiment, the integrated circuit may comprise a data memory, wherein the data memory may be written and/or read-out multiple times, but is not overwritable and/or deletable. In particular, the data memory may function to store crypto information. The advantage of this configuration of the data memory consists in the fact that data may advantageously only be added. That is, new data may be added to old data already present in the data memory. The older data may remain in the data memory. In this case, the data memory would not be overwritable. This may be used to secure a product comprising the apparatus according to the invention against forgery. For example, when manufacturing the product, the data memory may be written with manufacturing data (e.g. manufacturer, serial number, date). During the transport, the data memory may be written with transport data (e.g. shipping agency, country, date). Upon the arrival at the destination, the data memory may be written with corresponding destination data (e.g. buyer, country, date). Due to the fact that the data memory may be implemented to be non-deletable, the history of the product may be tracked. Due to the fact that the data memory may be implemented to be non-overwritable, the product may be effectively secured against forgery since the original data is permanently stored on the data memory.

A further aspect of the invention concerns the use of a microchip as a security feature in a product. Such a security feature may be used to secure a product against forgery. According to the above embodiments, the microchip may comprise an integrated circuit that may be contactlessly read out, and a metallization layer arranged on a first chip side of the microchip and a second metallization layer arranged on the opposite second chip side of the microchip. The two metallization layers may each be electrically coupled to the integrated circuit and function as an electrode for the capacitive readout of the integrated circuit. The microchip may be fixed to the product, and at least one of the first and second metallization layers may be covered by a portion of the product at least in portions. Alternatively, the microchip may be integrated into the product, and both metallization layers may be fully covered by the product itself. In principal, the microchip used herein may be a microchip having one or several features of the above-described embodiments. Accordingly, all claims depending on claim 1 may also be combined with the use of a microchip defined in claim 12.

A further aspect of the invention concerns a machine for processing, or handling, a product comprising an above-described apparatus. The machine may comprise a first handling apparatus and a second handling apparatus arranged opposite thereto, wherein, when handling the product, the first and second handling apparatuses are arrangeable opposite to a first and a second side of the product, respectively. The handling apparatuses may be an arm or a gripper. The first and the second handling apparatus may each comprise a region comprising metal, which, when handling the product, may be locally superimposed by the first and second metallization layers of the microchip, respectively, at least in portions. The respective handling apparatus region comprising metal may function as a corresponding counterelectrode to a respective metallization layer (electrode) of the microchip for the readout of the integrated circuit. Here, the first and/or second metallization layer of the microchip may be covered at least in portions by the product or by a portion of the product, wherein the part of the product covering the respective metallization layer may function as a dielectric. Alternatively or additionally, an air gap between the respective metallization layer and a corresponding counterelectrode may function as the dielectric. Thus, a dielectric may be arranged between the respective handling apparatus region comprising metal (counterelectrode) and the corresponding metallization layer (electrode) of the microchip. During readout of the integrated circuit, the respective handling apparatus region comprising metal and the respective metallization layer of the microchip may be orientated relative to each other such that they are opposite to each other at least in portions, or locally superimpose each other. That is, the first handling apparatus region comprising metal may be arranged opposite to the first metallization layer of the microchip, and the second handling apparatus region comprising metal may be arranged opposite to the second metallization layer of the microchip. In an embodiment, the respective handling apparatus region comprising metal may comprise approximately the same surface area as the respective metallization layer of the microchip. In order to enable tolerances when position-ing the respective handling apparatus relative to the microchip arranged in or at the product, the respective handling apparatus region comprising metal may comprise a surface area that is larger (e.g. an surface area that is five times or even ten times larger) than the respective metallization layer of the microchip.

According to a further embodiment, the machine may be a banknote counting device and the product may be a banknote. When counting the banknotes in a banknote counting device, the banknotes to be counted move past the respective handling apparatus within a small distance. That is, the banknotes fly past the grippers in a contactless manner. If the banknote comprises an apparatus according to the invention, the integrated circuit may be capacitively read out in a contactless manner.

A further aspect of the invention concerns a method for securing a product against forgery. Among other things, the method comprises providing a microchip with an integrated circuit that may be read out in a contactless capacitive manner, a first metallization layer arranged on a first chip side of the microchip, and a second metallization layer arranged on a second chip side opposite thereto. The first and second metallization layers are each electrically coupled to the integrated circuit and function as an electrode for a capacitive readout of the integrated circuit. Furthermore, the method comprises fixing the microchip to the product or integrating the microchip into the product. In principal, the microchip used herein may be a microchip having one or several features of the above-described embodiments. Thus, all claims depending on claim 1 may also be combined with the method defined in claim 15.

A further aspect of the invention concerns a RFID chip to be embedded into a sheet-like document, having two opposite metal surfaces, wherein the metal surfaces are connected to two contacts of the chip.

A further aspect of the invention concerns a RFID chip integrated into the paper of a sheet-like document, characterized in that it does not comprise touching contacting regions.

A further aspect of the invention concerns an apparatus for counting and verifying sheet-like documents, in particular banknotes, comprising two grippers provided with counterelectrodes and arranged in the region of the metallizations of the chip.

A further aspect of the invention concerns a method for reading out information from at least one RFID chip embedded into at least one sheet-like document, wherein counterelectrodes arranged at the grippers are coupled to metallizations of the RFID chip by means of capacitive coupling and are read out from the RFID chip by means of capacitive coupling.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
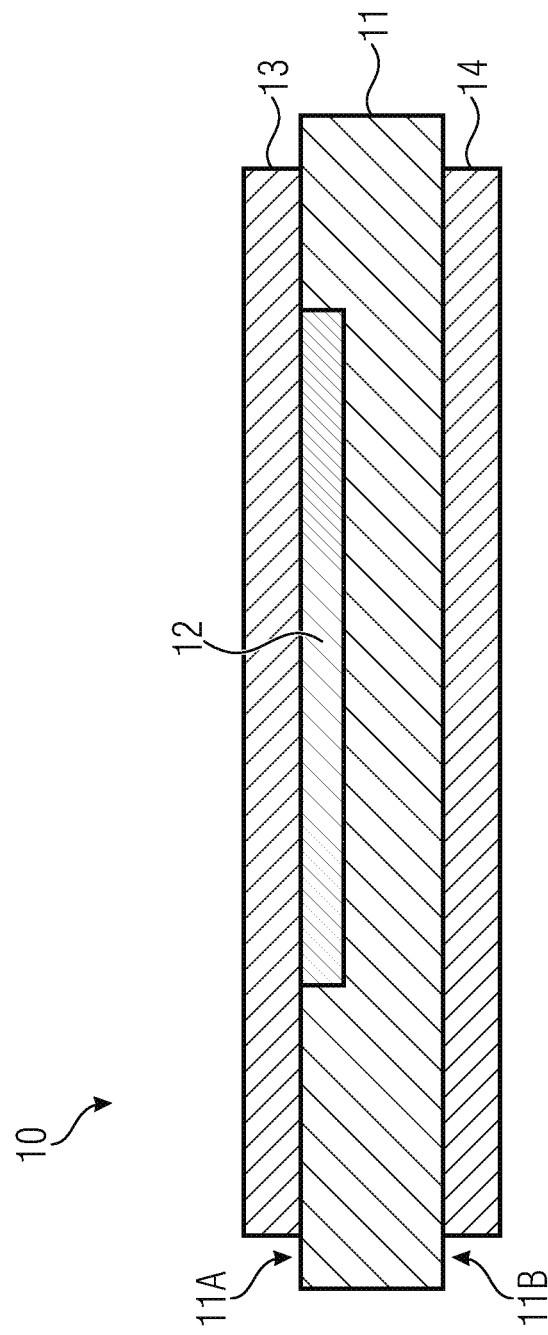
FIG. 1A shows a schematic side-sectional view of an apparatus according to an embodiment.

In the following, embodiments are described in more detail with reference to the figures, wherein elements having the same or similar functions are provided with the same reference numerals.

Method steps illustrated in a block diagram and described with reference to the same may also be performed in a sequence that differs from the sequence illustrated or described. In addition, method steps concerning a certain feature may also be interchanged with this feature of the apparatus, and vice versa.

In addition, a banknote is described herein as a non-limiting example for a product that may be secured against forgery. However, other products that may be secured against forgery by means of the concept according to the invention may also be conceivable.

Figure 1B:
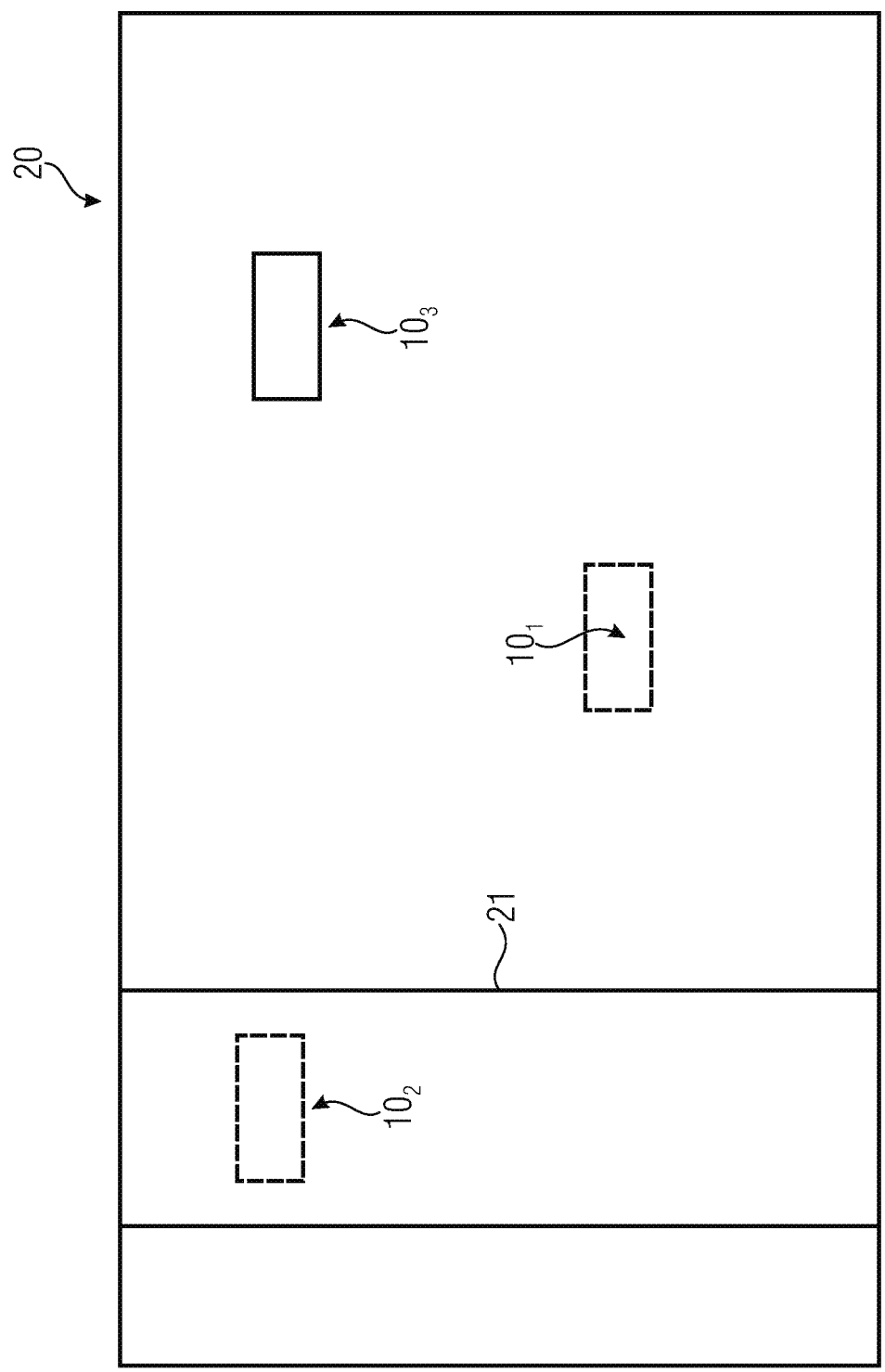
FIG. 1B shows a schematic top view of a product provided with an apparatus according to an embodiment.

FIGS. 1A and 1B show an inventive apparatus 10 (FIG. 1A) for securing a product 20 (FIG. 1B) against forgery and/or for storing crypto information, which in turn may be used for securing the product 20 against forgery.

The apparatus 10 comprises a microchip 11. The microchip 11 comprises an integrated circuit 12. The integrated circuit 12 may be read out in a capacitive and contactless manner. The microchip 11 comprises a first chip side 11A and a second chip side 11B arranged opposite thereto. A first metallization layer 13 is arranged on the first chip side 11A of the microchip 11. A second metallization layer 14 is arranged on the opposite second chip side 11B of the microchip 11. For example, the metallization layers 13, 14 may be applied or deposited onto the respective chip side 11A, 11B through sputtering or vapor deposition by means of CVD processes or the like.

Both metallization layers 13, 14 are each electrically coupled to the integrated circuit 12. Each metallization layer 13, 14 functions as an electrode for the capacitive readout of the integrated circuit 12. For this, the integrated circuit 12 may comprise, e.g., a memory, in particular a non-volatile memory, for example. A data set enabling an authentication of the microchip 11 and therefore of the product 20 at or in which the microchip 11 is arranged or integrated, respectively, may be stored on the memory. For example, such a data set may comprise a unique code in form of numbers and/or letters such as a continuous serial number. The readout of the integrated circuit 12 may therefore be particularly understood as the readout of such a memory.

The apparatus 10, or the microchip 11, may be fixable to the product 20 to be protected against forgery or may be integrable into the product 20. FIG. 1B shows some examples in this regard.

FIG. 1B shows a banknote as a non-limiting example for a product 20 to be protected against forgery with the concept according to the invention. For example, the apparatus may be partially or entirely integrated into the product 20, which is schematically illustrated with the apparatus $10_1$. Accordingly, the apparatus $10_1$ is partially or fully covered by the product 20. In the example illustrated here, the apparatus $10_1$ is fully integrated into the product 20 and therefore fully covered by the product 20, which is why the apparatus $10_1$ is not visible from the outside and is therefore illustrated using dotted lines. Here, the first and second metallization layers 13, 14 are also fully covered by the product 20.

The product 20 may comprise further components that are also part of the product 20 or that belong the product 20. For example, the banknote 20 exemplarily illustrated here may comprise one or several security features 21 that are part of the banknote 20. For example, such security features 21 may be polymer strips, holograms and the like. Such a part of the product 20 may therefore be a portion 21 of the product 20 that belongs to the product 20. According to such a conceivable embodiment, the apparatus according to the invention may be partially or fully covered by such a portion 21 of the product 20, which is schematically illustrated with the apparatus $10_2$. The apparatus $10_2$ is exemplarily covered by such a portion 21, e.g. a security feature in the form of a polymer strip. This security feature fully covers the apparatus $10_2$ in this example, which is why the apparatus $10_2$ is not visible from the outside and is therefore illustrated using dotted lines. In this case, one of the two metallization layers 13, 14 may be in contact with the product 20, and the other one of the two metallization layers 13, 14 may be partially or fully covered by the portion 21 of the product 20.

According to the exemplarily described embodiments above, in particular, the microchip 11 may be fixable to the product 20 or integrable into the product 20 such that at least one of the two metallization layers 13, 14 is covered by a portion 21 of the product 20. The at least one metallization layer 13, 14 may be partially or fully covered by the portion 21 of the product 20.

As mentioned above, the two metallization layers 13, 14 may each function as an electrode for a capacitive readout of the integrated circuit 12. For this, a counterelectrode, e.g. which may be arranged at a reader, may be brought into the proximity of the respective metallization layer 13, 14. In this case, a part of the product 20 covering the respective metallization layer 13, 14 may function as the dielectric.

Alternatively, the apparatus may be arranged on the outside of the product 20, which is schematically illustrated with the apparatus $10_3$. In this case, for example, one of the two metallization layers 13, 14 would be in contact with a surface of the product 20 and the other one of the two metallization layers 13, 14 would be arranged on the outside of the product 20 so as to be exposed. In this case, in order to protect the exposed metallization layer 13, 14, an additional material could be arranged at the apparatus $10_3$, and in particular on the respective metallization layer 13, 14.

Figure 2:
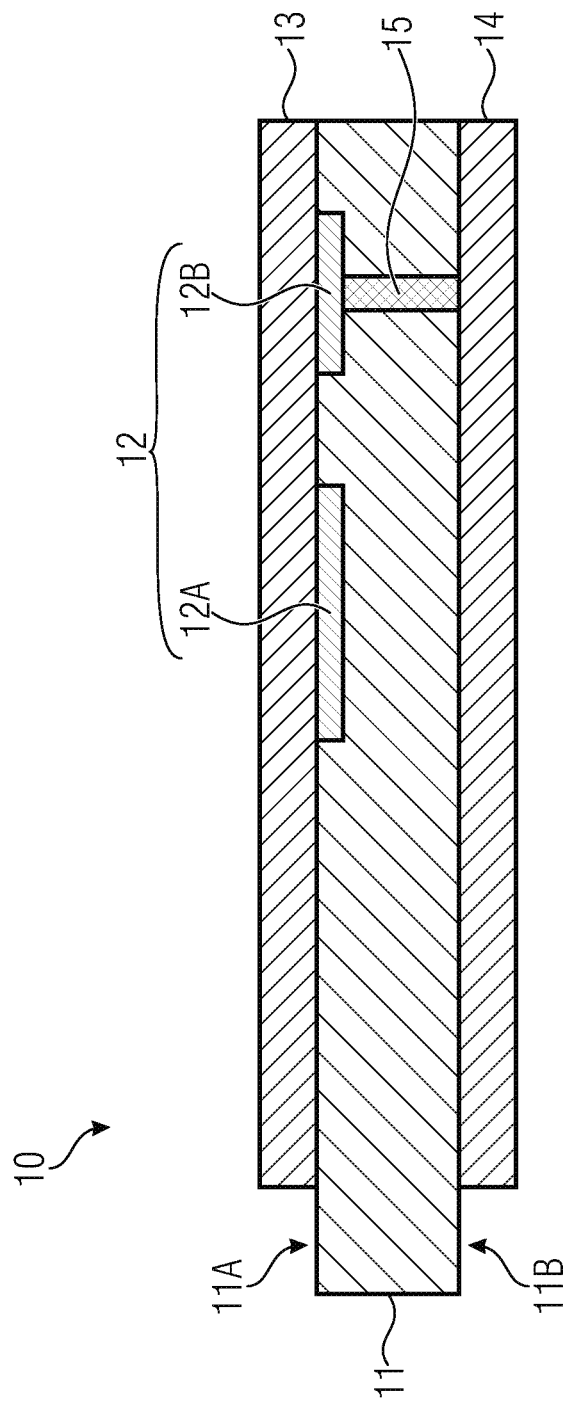
FIG. 2 shows a schematic side-sectional view of an apparatus according to a further embodiment.

FIG. 2 shows a further embodiment of an apparatus 10 according to the invention. The first metallization layer 13 is arranged on the first chip side 11A. The second metallization layer 14 is arranged on the second chip side 11B opposite to the first chip side 11A. The microchip 11 also comprises a metallization on both sides.

The first metallization layer 13 may function as a first electrode. The second metallization layer 14 may function as a second electrode. For this, the first and second metallization layers 13, 14 may each be electrically coupled to the integrated circuit 12.

In the example illustrated here, the integrated circuit 12 comprises a first electric contact, or pole, 12A, and a second electric contact, or pole, 12B. The first metallization layer 13 may be connected to the first electric pole 12A, and the second metallization layer 14 may be connected to the second electric pole 12B.

As can be seen, the two electric poles 12A, 12B may be arranged on the same chip side, e.g. here the first chip side 11A. In order to electrically contact the second metallization layer 14, the microchip 11 may comprise a via 15 extending between the first chip side 11A and the second chip side 11B. For example, this via 15 may be configured as a TSV (Through Silicon Via). The second metallization layer 14 is electrically connected to the second contact, or pole, 12B arranged on the opposite first chip side 11A by means of this via 15.

The first metallization layer 13 may partially or fully cover the first chip side 11A. The second metallization layer 14 may partially or fully cover the second chip side 11B.

Figure 3:
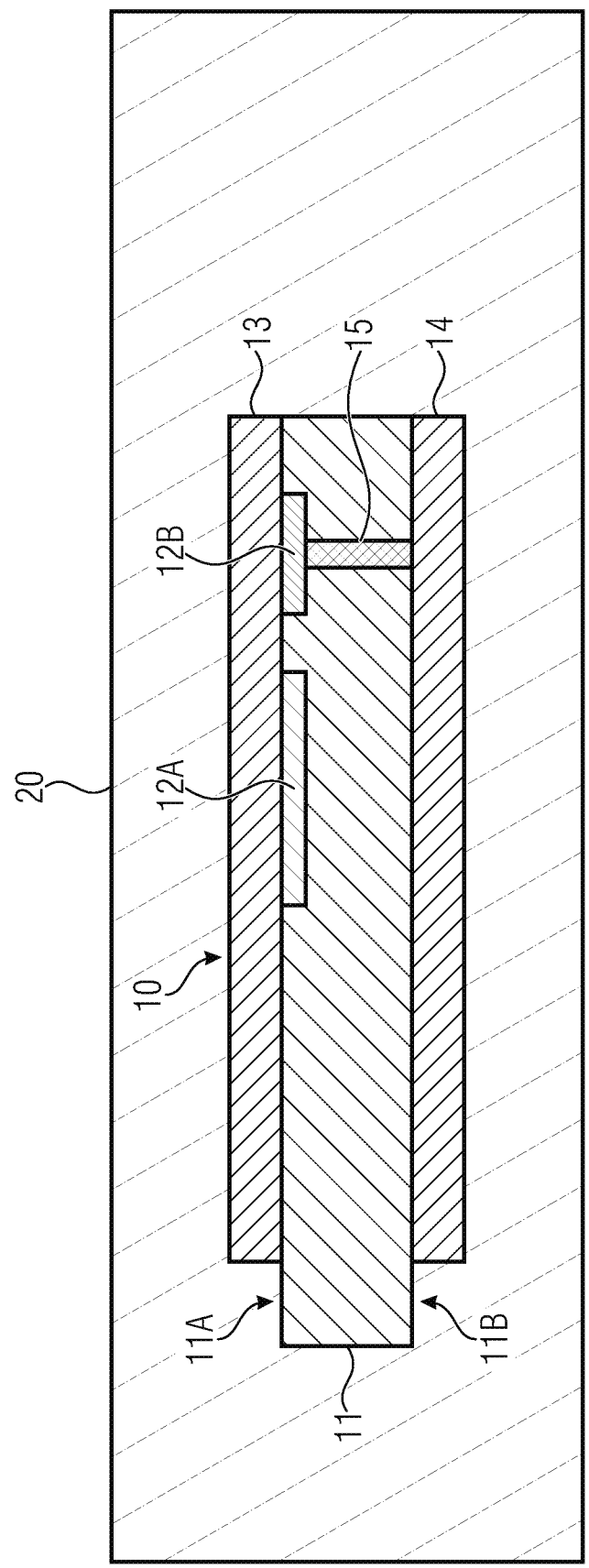
FIG. 3 shows a schematic side-sectional view of an apparatus according to an embodiment, wherein the apparatus is integrated into a product.

FIG. 3 shows a further embodiment, wherein the apparatus 10 previously described with respect to FIG. 2 is integrated into a product 20 to be secured against forgery.

As can be seen, the first chip side 11A of the microchip 11 is essentially arranged in parallel to a first side 20A of the product 20. The second chip side 11B of the microchip 11 is essentially arranged in parallel to a second side 20B of the product 20 opposite to the first side 20A of the product 20.

In addition, the first chip side 11A of the microchip 11 is arranged opposite to the first side 20A of the product 20. The second chip side 11B of the microchip 11 is arranged opposite to the second side 20B of the product 20.

Thus, a capacitive readout of the integrated circuit 12 of the microchip 11 is possible from both sides of the product 20.

In this embodiment, both metallization layers 13, 14 are each covered by a part of the product 20. In this case, the first metallization layer 13 arranged on the first chip side 11A is covered by a part of the product 20 arranged on the first side 20A of the product 20. On the other hand, the second metallization layer 14 arranged on the second chip side 11B is covered by a part of the product 20 arranged on the second side 20B of the product 20.

As initially mentioned, the part of the product 20 may be the product 20 itself, or a portion 21 (e.g. polymer strip, hologram, etc.) belonging to the product 20.

Figure 4A:
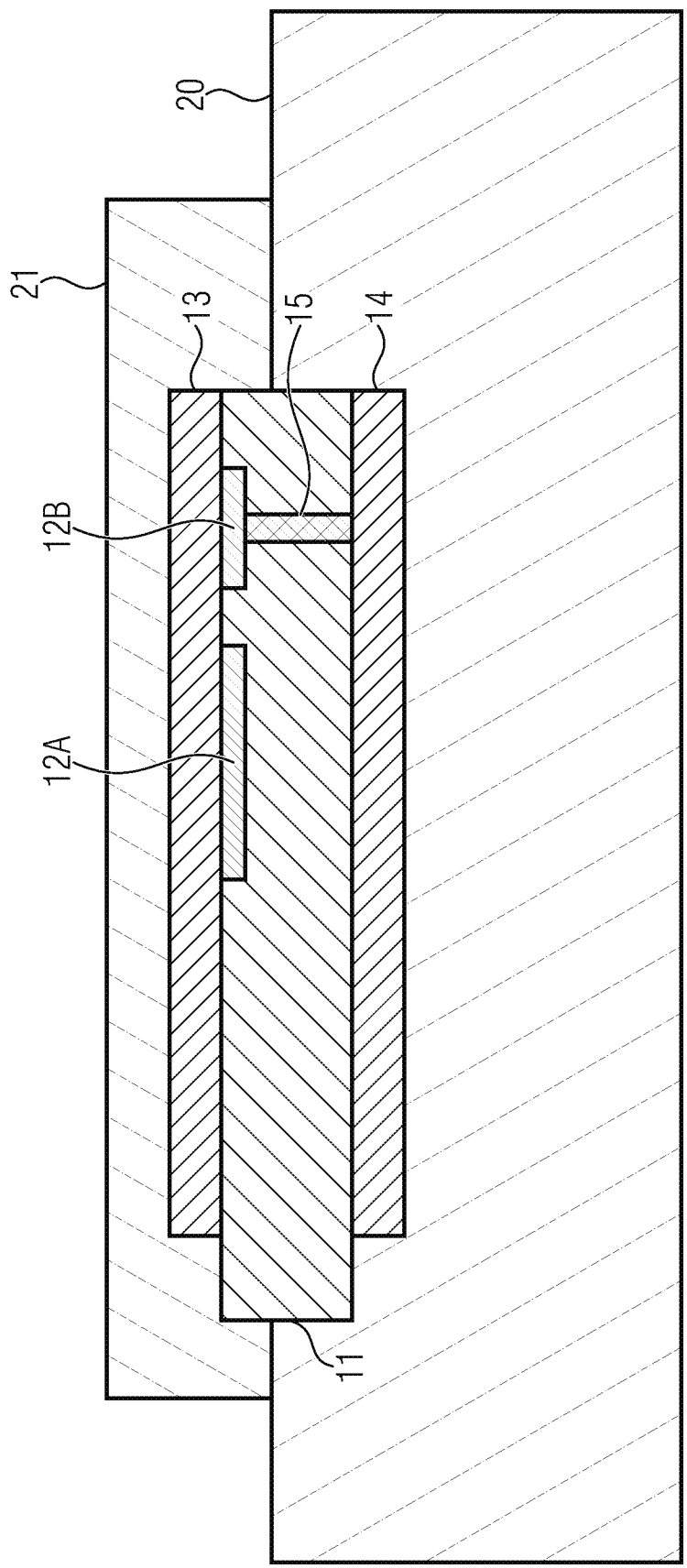
FIG. 4A shows a schematic side-sectional view of an apparatus according to an embodiment, wherein the apparatus is integrated into a product at least in portions and is covered by a portion of the product.

FIG. 4A shows an embodiment, wherein the apparatus 10 is partially integrated into the product 20, and wherein at least one metallization layer, in this example the first metallization layer 13 arranged on the first chip side 11A, is covered by a portion 21 of the product 20, wherein this portion 21 is exemplarily illustrated as a security feature of a banknote 20.

For example, this security feature 21 may be a polymer strip. In this embodiment, the portion 21 fully covers the first metallization layer 13. However, it is also conceivable that the portion 21 only partially covers the first metallization layer 13. In this example, the portion 21 forms a dielectric.

The apparatus 10 comprising the two metallization layers 13, 14 may also be partially or fully covered by a portion 21, e.g. a security feature, of the product 20 if the apparatus 10 is not, as is exemplarily illustrated in FIG. 4A, partially or fully integrated into the product 20, but is arranged at, or fixed to, a surface of the product 20.

Figure 4B:
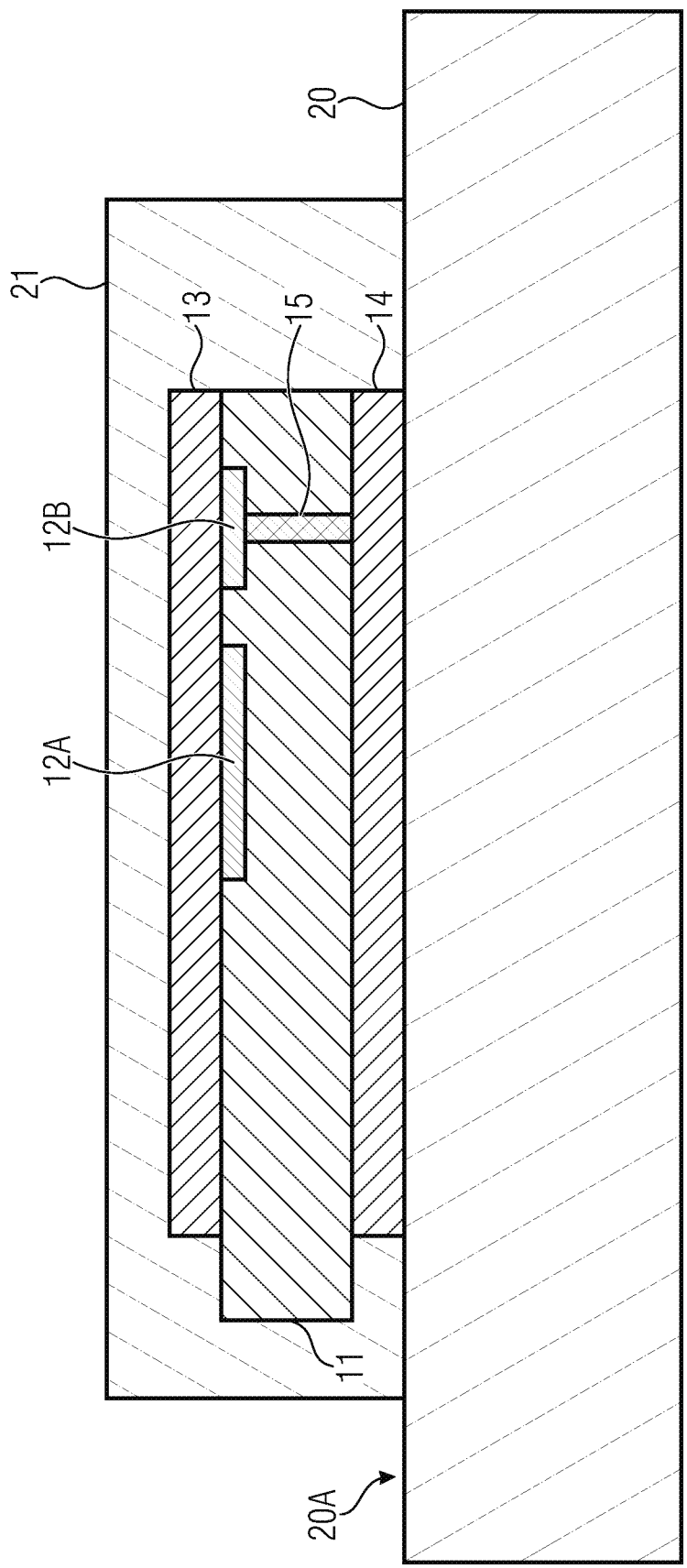
FIG. 4B shows a schematic side-sectional view of an apparatus according to an embodiment, wherein the apparatus is arranged at a surface of the product and is covered by a portion of the product.

This is exemplarily illustrated in FIG. 4B. Here, the apparatus 10 is arranged at a surface, or a first side 20A, of the product 20 and is covered by a portion 21 of the product 20. The portion 21 may partially, or as illustrated here, fully cover the apparatus 20. In other words, at least one of the two metallization layers 13, 14 is covered by the portion 21 of the product 20.

The inventive apparatus 10 comprising two oppositely arranged metallization layers 13, 14 has the advantage that the integrated circuit 12 may be capacitively read out in a contactless manner from both sides 20A, 20B of the product 20.

Figure 5:
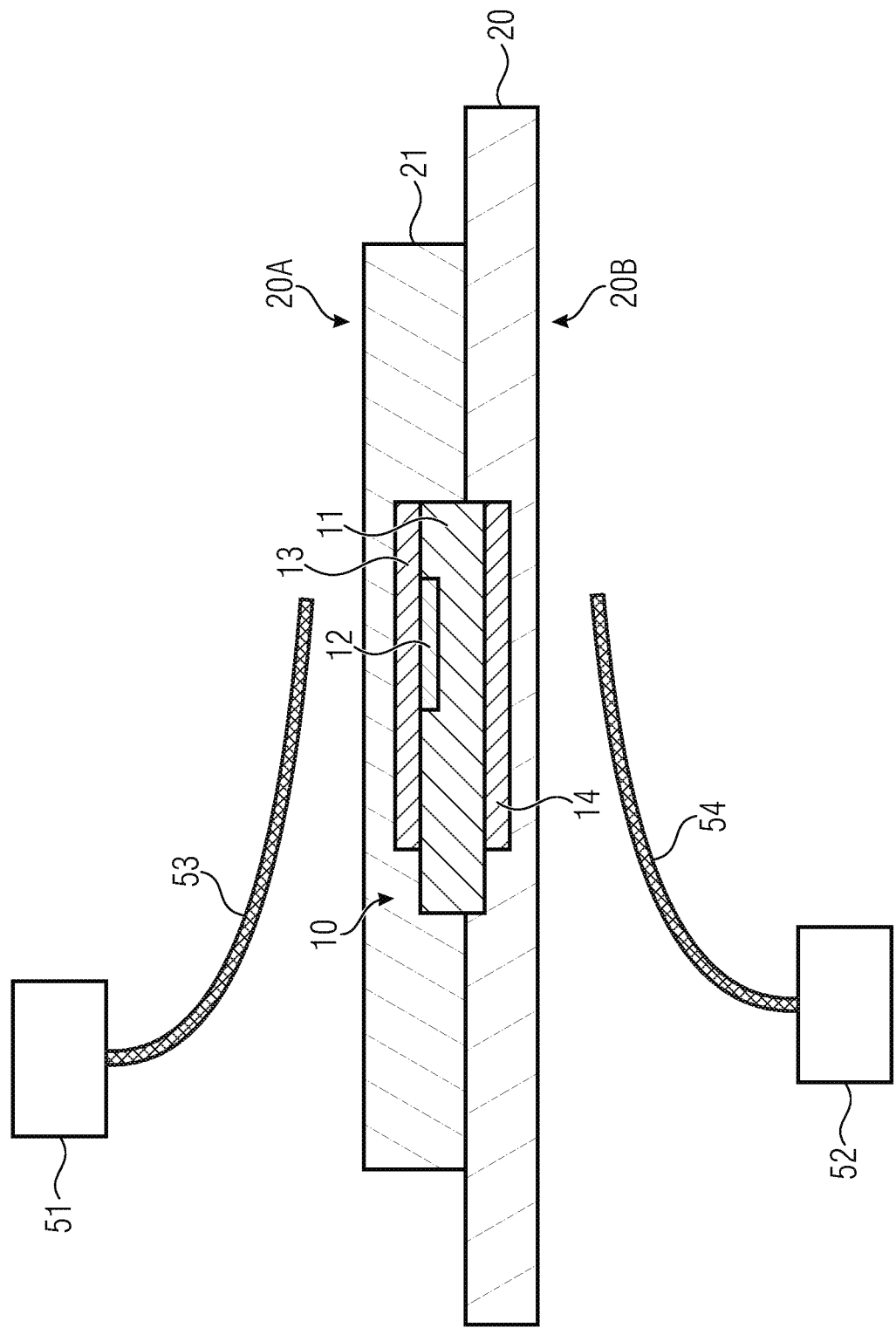
FIG. 5 shows a schematic view of a part of a machine for handling a product provided with an inventive apparatus according to an embodiment.

Such an example is shown in FIG. 5. Here, the apparatus 10 previously described with respect to FIG. 4 is exemplarily illustrated as being at least partially integrated into a banknote 20 and fully covered by a security feature 21 of the banknote.

FIG. 5 further shows a section of a machine for processing, or handling, the banknote 20. For example, this may be a money counting device.

The money counting device may comprise at least one first handling apparatus 51. In the illustrated example, the money counting device further comprises a second handling apparatus 52 arranged opposite to the first handling apparatus 51. Furthermore, the handling apparatuses 51, 52 may be configured at gripping arms.

At least one, advantageously both, of the first and second handling apparatuses 51, 52 may comprise a region 53, 54 comprising metal. As can be seen, when handling the product 20 (e.g. counting the banknotes 20), the first handling apparatus 51 region 53 comprising metal is partially, advantageously fully, locally superimposed with the first metallization layer 13 arranged on the first chips side 11A. In other words, when handling the product 20, the first handling apparatus 51 region 53 comprising metal is partially, advantageously fully, opposite to the first metallization layer 13 arranged on the first chip side 11A.

Analogously, the same applies to the second handling apparatus 52. When handling the product 20, the second handling apparatus 52 region 54 comprising metal is partially, advantageously fully, superimposed with the second metallization layer 14 arranged on the second chip side 11B. In other words, when handling the product 20, the second handling apparatus 52 region 54 comprising metal is partially, advantageously fully, opposite to the second metallization layer 14 arranged on the second chip side 11B.

The first handling apparatus 51 region 53 comprising metal and the second handling apparatus 52 region 54 comprising metal each function as a counterelectrode for being capacitively coupled to the first and second metallization layer 13, 14, respectively, that are each configured as an electrode. The part of the product 20 covering the respective metallization layer 13, 14 functions as a dielectric between the respective metallization layer 13, 14 configured as an electrode and the respective handling apparatus 51, 52 regions 53, 54 comprising metal configured as a counterelectrode.

Thus, the integrated circuit 12 may be capacitively read out in a contactless manner. Here, contactless particularly refers to a contact between the electrode and the counterelectrode, i.e. between the respective metallization layer 13, 14 and the respective region 53, 54 comprising metal.

However, contactless may also refer to a contact between the product 20 and a counterelectrode, i.e. between the product 20, or a portion 21 of the product 20, and the respective region 53, 54 comprising metal. In FIG. 5, this is schematically indicated by the fact that the respective handling apparatus 51, 52 regions 53, 54 comprising metal are spaced apart from the product 20. The capacitive readout of the integrated circuit 12 may therefore be performed in a contactless manner.

This capacitive read out differs from a transfer of radio waves by means of antennas, wherein these antennas are connected as microchip-external antennas to contacts of the microchip. On the other hand, the apparatus 10 according to the invention comprises a capacitive antenna integrated into the microchip 11, i.e. the apparatus 10 may be configured without a microchip-external antenna. In this case, the first and second metallization layers 13, 14 may form a capacitive antenna integrated into the microchip 11.

Figure 6:
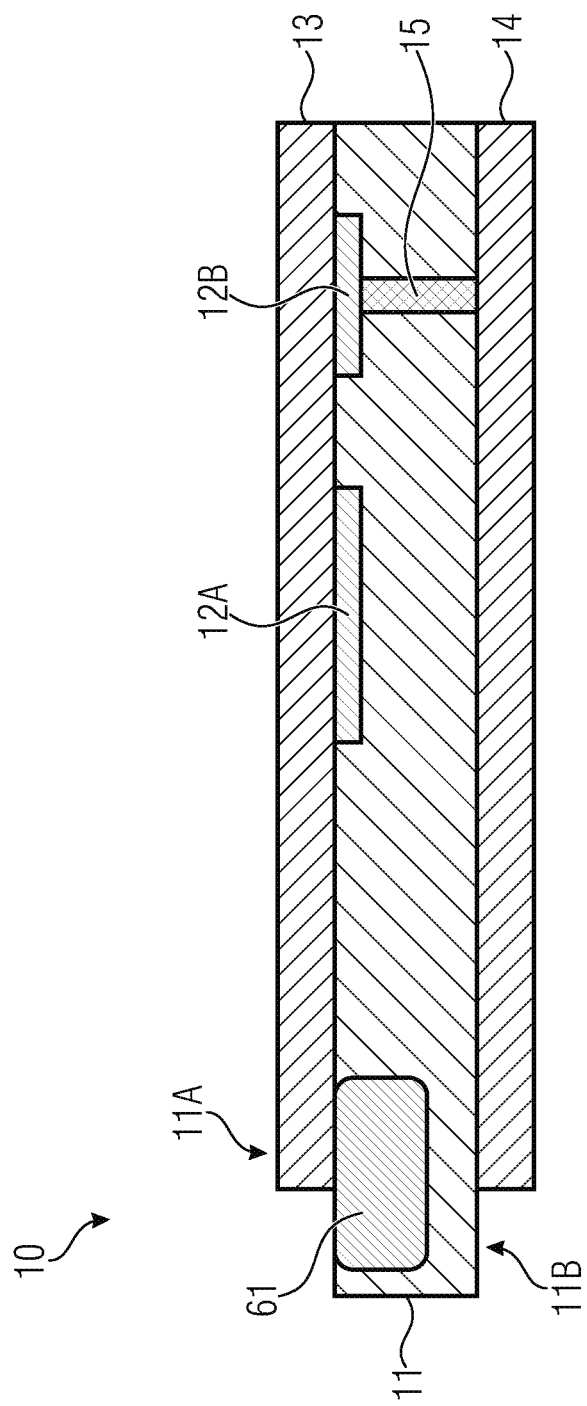
FIG. 6 shows a schematic side-sectional view of an apparatus according to a further embodiment.

FIG. 6 shows a further embodiment of an apparatus 10 according to the invention. Essentially, apparatus 10 corresponds to the apparatus described with respect to FIG. 2; however, with the difference that a photodiode 61 is additionally provided.

The photodiode 61 may be integrated into the microchip 11. The photodiode 61 may be arranged on the first chip side 11A or on the second chip side 11B. Alternatively, two photodiodes 61 may be provided, wherein a first photodiode 61 is arranged on the first chip side 11A and a second photodiode 61 is arranged on the second chip side 11B.

The photodiode 61 may be coupled to the integrated circuit 12, wherein the integrated circuit 12 may comprise a control routine for operating the photodiode 61. For example, the integrated circuit 12 may be implemented in order to enable the capacitive readout of the integrated circuit 12 only if the photodiode 61 registers light flashes in a predetermined order, and/or in a predetermined frequency, and/or in a predetermined wavelength range.

The light flashes may be sent out by a light emitter, for example, which is arranged in a machine for handling the product 20. For example, such an emitter may be provided in a money counter such as exemplarily described above with respect to FIG. 5.

Figure 7:
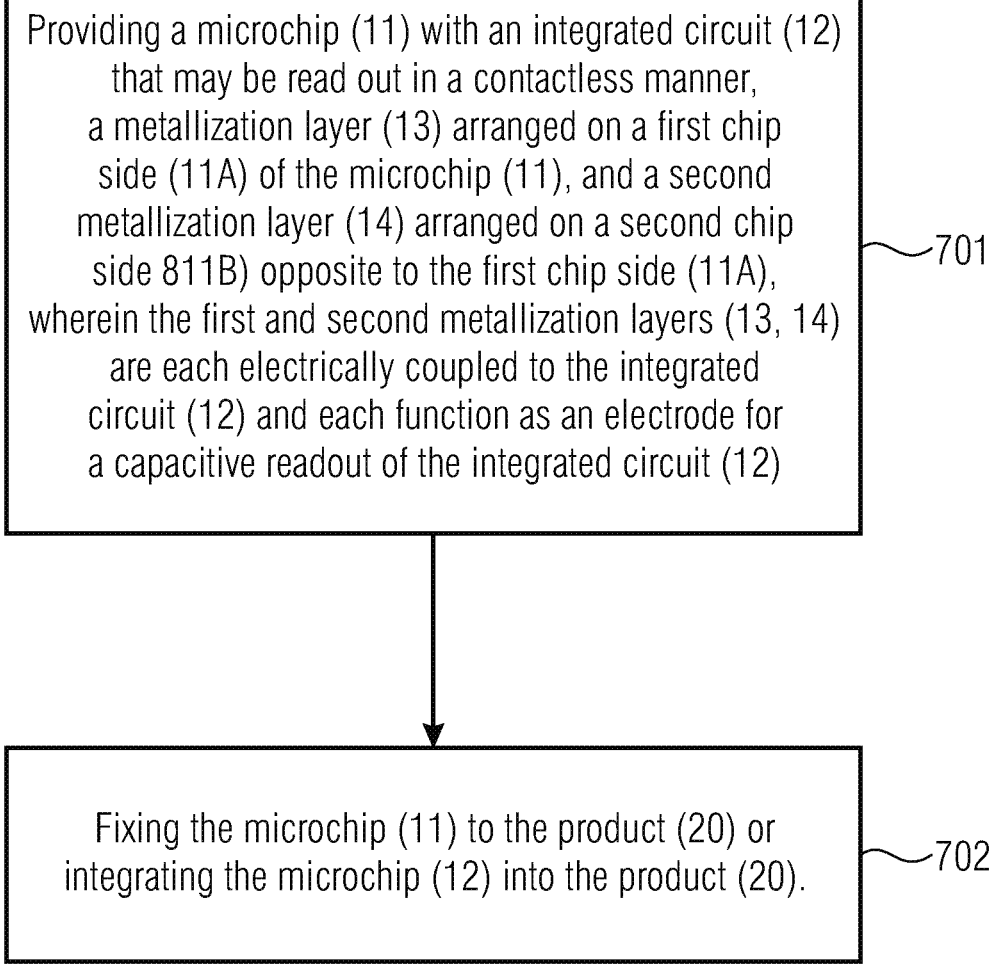
FIG. 7 shows a block diagram of a method for securing a product against forgery according to an embodiment.

FIG. 7 shows a schematic block diagram of a method according to the invention for securing a product 20 against forgery according to an embodiment.

In block 701, a microchip 11 with an integrated circuit 12 that may be read out in a contactless manner, a first metallization layer 13 arranged on a first chip side 11A of the microchip 11, and a second metallization layer 14 arranged on an opposite second chip side 11B is provided, wherein the first and second metallization layers 13, 14 are each electrically coupled to the integrated circuit 12 and each function as an electrode for the capacitive readout of the integrated circuit 12.

In block 702, the microchip 11 is fixed to the product 20, or the microchip 11 is integrated into the product 20.

In summary, the inventive apparatus 10 according to an embodiment may be fully integrated into the product 20 (cf. e.g. FIG. 3). In this case, the first and second metallization layers 13, 14 may each be fully covered by the product 20. According to a further embodiment, the apparatus 10 may be arrangeable at fixable to the product 20 (cf. e.g. FIG. 4B). In this case, at least one of the two metallization layers 13, 14 may be partially or fully covered by a part of the product 20. A part of the product 20 may be the product 20 itself or a portion 21 of the product 20, e.g. a security feature (polymer strip, etc.) that belongs to the product 20. According to a further embodiment, the apparatus 10 may be at least partially integrable into the product 20 (cf. e.g. FIG. 4A). In this case, at least one of the two metallization layers 13, 14 may be partially or fully covered by a part of the product 20.

Subsequently, the present invention is again summarized in other words:

Among other things, the invention concerns a microelectronic chip 11 that is embeddable into flat, sheet-like objects 20, in particular as a further security feature. For example, these are papers as used for printing documents, bonds and/or banknotes.

Technical Problem of the Invention

Banknotes have been the target of forgery. In order to prevent this, there is a multitude of security features integrated into banknotes. Until now, no electronic security features have been realized in banknotes, since the integration costs are too high.

In the case of counting devices for banknotes, individual banknotes are successively taken from a stack of banknotes by means of two grippers and are placed onto another stack. During this counting phase, or stacking phase, only a short period of time of typically 0.025 seconds, or 25 milliseconds, is available per banknote. In this period of time, a banknote is to be counted, checked for authenticity, and its serial number is to be read out. However, existing technologies with dipole antennas or antenna coils for a contactless readout of RFID chip cards need more time.

Previous attempts to integrate silicon chips into paper, particularly into banknotes, have failed due to the requirement that the antenna (coil or dipole) has to be contacted with contact pads on the chip. Due to the high mobility or the small bending radius of banknotes in use, these contacts delaminate and tear open.

In order to electrically connect antennas to the chip, complex and costly process steps are needed during the production. The effort to precisely place the chip relative to the antenna is too expensive. This problem has been described in publications of the Deutsche Bundesbank (central bank of the Federal Republic of Germany).

Solution According to the Invention

Instead of coupling the chip and the reading device with a dipole antenna or an antenna coil with electromagnetic radio waves across a distance of a few centimeters as previously done, according to the invention, one or two metal surfaces 13, 14 on the chip surfaces 11A, 11B and the very proximate grippers 51, 52 for gripping a product 20 provided with the chip 11 are to be capacitively coupled.

These metal surfaces 13, 14 may fully cover the top and bottom sides 11A, 11B of the chip 11, respectively, or, according to an embodiment of the invention, only partially cover the same.

The distance of the grippers 51, 53 to the metal surfaces 13, 14 on the chip surfaces 11A, 11B will typically be less than one millimeter. According to an exemplary embodiment, the surface area of the metallization 13, 14 on the chip 11 may essentially correspond to the surface area of the chip 11. The front side 11A and the rear side 11B of the chip 11 may be metalized and connected to the two poles 12A, 12B of the chip 11. In this case, the metal surface 13 on the front side 11A may be connected to the first contact 12A of the RFID chip 11. The second metal surface 14 or the rear side 11B may be connected to a second contact 12B of the RFID chip 11 by means of a via 15 through the chip 11.

In the physical sense, this may also represent a dipole, which, in contrast to normal dipoles, has very short and wide arms.

The chip 11 transmits the information stored in it to the reading device upon request. For example, this information may be the serial number; however, it may also be any other particularly unique information. In particular, it may also be encrypted security information. For example, the thickness of the chip 11 may be between 50 µm and 10 µm, and 0.03 mm or the 30 µm. Since it is so thin, the otherwise rigid and brittle silicon chip 11 is flexible and bendable. Due to the metallization 13, 14 on both sides, an increased effort is needed if a forger wants to identify the characteristics of the chip 11 in order to reproduce it.

The chip 11 with its metallization 13, 14 may be placed on the banknote 20 in the region of a polymer strip 21 arranged on the banknote. In this case, only minor requirements with respect to the accuracy of the placement have to be fulfilled. An inaccuracy of a few millimeters may be tolerated since the counterelectrodes 53, 54 on the two grippers 51, 52 may be realized to be large. Since the chip 11, and therefore the metallization 13, 14, typically each comprises an edge length of 1 mm or less, the counterelectrodes 53, 54 may be significantly larger, up to 10 mm or more.

With this arrangement, a banknote 20 may be reliably detected and read out even if it comes to rest slightly offset due to unavoidable inaccuracies or tolerances as the speed of the counting device is high. The narrow slit between the counterelectrodes 53, 54 on the grippers 51, 52 and the metallizations 13, 14 on the chip 11 may advantageously be only given by the superimposition with paper or polymer and an air gap. Due to the narrow slit and a relatively large surface area of the capacitive coupling, a high quality of transfer with low interference effects is given. This enables a high transmission rate and short readout time.

In an embodiment, due to the omission of antennas, which in turn consist of an additional material and have to be contacted to the chip 11, the manufacturing can be substantially simplified and therefore implemented in a more cost-efficient manner. Precise positioning of the chip 11 is not important. It is also not a problem if the chip 11 is turned in its orientation since it only interacts with the environment through the two opposite metal surfaces 13, 14. Turning the chip 11 over, i.e. switching top and bottom sides 11A, 11B, is also not a problem since the capacitive coupling may be performed by means of an alternating current. In addition to banknotes 20, other valuable documents such as IDs, certificates, bonds, tickets, etc., may also be protected in this way.

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

Some or all of the method steps may be performed by a hardware device (or using a hardware device), such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier. In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus, comprising:
a microchip with an integrated circuit that may be read out in a contactless manner,
a first metallization layer arranged on a first chip side of the microchip, and a second metallization layer arranged on a second chip side opposite to the first chip side,
wherein the first and second metallization layers are each electrically coupled to the integrated circuit and function as electrodes for a capacitive readout of the integrated circuit,
wherein the apparatus further comprises a photodiode that is electrically coupled to the integrated circuit, wherein the integrated circuit is configured to enable the capacitive readout only if the photodiode registers light flashes in at least one of a predetermined order, a predetermined frequency, or a predetermined wavelength range, and
wherein the microchip is fixable to a product or integrable into the product.

2. The apparatus according to claim 1, wherein the microchip is fixable to the product such that at least one of the first and second metallization layers is at least partially covered by a portion of the product,
or wherein the microchip is integrable into the product such that the first and second metallization layers are each fully covered by the product.

3. The apparatus according to claim 2, wherein the at least one of the first and second metallization layers is fully covered by the portion of the product.

4. The apparatus according to claim 1, wherein the first metallization layer arranged on the first chip side is coupled to a first electric contact of the integrated circuit, and wherein the second metallization layer arranged on the second chip side is coupled to a second electric contact of the integrated circuit, wherein the first and second electric contacts of the integrated circuit are arranged on the first chip side, and wherein the microchip comprises a via extending between the first and second chip sides, wherein the second metallization layer arranged on the second chip side is coupled to the second electric contact arranged on the first chip side by means of this via.

5. The apparatus according to claim 1, wherein a part of the product covering the first metallization layer is arranged on a first side of the product, and wherein a part of the product covering the second metallization layer is arranged on a second side of the product opposite to the first side.

6. The apparatus according to claim 1, wherein the first metallization layer at least partially covers the first chip side, or wherein the first metallization layer fully covers the first chip side, or wherein the second metallization layer at least partially covers the second chip side or wherein the second metallization layer fully covers the second chip side.

7. The apparatus according to claim 1, wherein the apparatus does not comprise a microchip-external antenna.

8. The apparatus according to claim 1, wherein the apparatus is configured such that the contactless capacitive readout of the integrated circuit comprises a range of below 10.

9. The apparatus according to claim 1, wherein the product is configured in a sheet-like manner and comprises at least one of paper and plastic, or wherein the product comprises paper that is used for printing at least one of documents, bonds or banknotes.

10. The apparatus according to claim 1, wherein the integrated circuit comprises a data memory, wherein the data memory is writable or readable multiple times, but is not overwritable or deletable.

11. A machine for handling a product comprising an apparatus according to claim 1,
wherein the machine comprises a first region comprising metal and a second region comprising metal arranged opposite thereto,
wherein, for the capacitive readout of the integrated circuit, the first region comprising metal functions as a counterelectrode to the first metallization layer functioning as an electrode, and the second region comprising metal functions as a counterelectrode to the second metallization layer functioning as an electrode,
wherein, for the readout of the integrated circuit, the first region comprising metal is locally superimposable with the first metallization layer at least in portions, and wherein the second region comprising metal is locally superimposable with the second metallization layer at least in portions, and
wherein the machine comprises a light emitter for emitting light flashes as an additional protection mechanism for securing the product against forgery.

12. The machine according to claim 11, wherein the machine is a money counting device and the product is a banknote.

13. A method, comprising:
providing a microchip with an integrated circuit that may be read out in a contactless manner, a first metallization layer arranged on a first chip side of the microchip, and a second metallization layer arranged on a second chip side opposite to the first chip side,
wherein the first and the second metallization layers are each electrically coupled to the integrated circuit and function as electrodes for a capacitive readout of the integrated circuit,
providing a photodiode that is electrically coupled to the integrated circuit, wherein the integrated circuit is configured to enable the capacitive readout only if the photodiode registers light flashes in at least one of a predetermined order, a predetermined frequency, or a predetermined wavelength range, and
fixing the microchip to a product or integrating the microchip into the product.

14. An apparatus, comprising:
a microchip with an integrated circuit that may be read out in a contactless manner,
a first metallization layer arranged on a first chip side of the microchip, and a second metallization layer arranged on a second chip side opposite to the first chip side,
wherein the first and second metallization layers are each electrically coupled to the integrated circuit and function as electrodes for a capacitive readout of the integrated circuit,
wherein the first metallization layer arranged on the first chip side is coupled to a first electric contact of the integrated circuit, and wherein the second metallization layer arranged on the second chip side is coupled to a second electric contact of the integrated circuit, wherein the first and second electric contacts of the integrated circuit are arranged on the first chip side, and wherein the microchip comprises a via extending between the first and second chip sides, wherein the second metallization layer arranged on the second chip side is coupled to the second electric contact arranged on the first chip side by means of this via, and wherein the microchip is fixable to a product or integrable into the product.

* * * * *